F. T. BYERS.
METHOD OF REMOVING LOOSE MATERIALS, DUST, AND GASES FROM MINES.
APPLICATION FILED DEC. 24, 1908.
Reissued Feb. 23, 1909.
12,923.
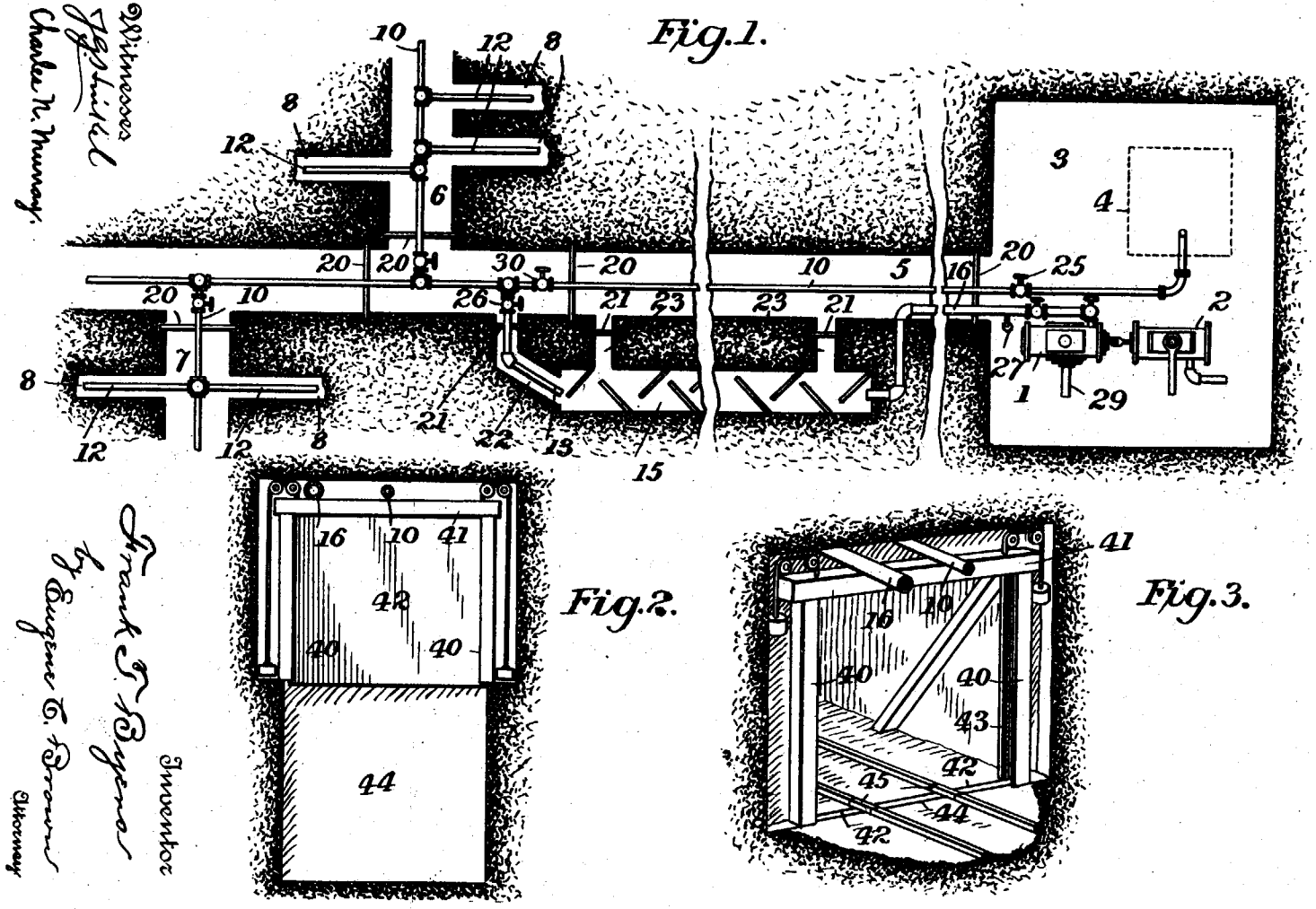
Witnesses
J. G. Stinkel
Charles N. Murray.
Inventor
Frank T. Byers
by Eugene C. Brown
Attorney
THE NORRIS PETERS CO., WASHINGTON, D. C.

UNITED STATES PATENT OFFICE.

FRANK T. BYERS, OF MOUNT PLEASANT, PENNSYLVANIA.

METHOD OF REMOVING LOOSE MATERIALS, DUST, AND GASES FROM MINES.

No. 12,923. Specification of Reissued Letters Patent. Reissued Feb. 23, 1909.

Original No. 899,509, dated September 29, 1908, Serial No. 442,317. Application for reissue filed December 24, 1908. Serial No. 469,185.

*To all whom it may concern:*

Be it known that I, FRANK T. BYERS, a citizen of the United States, residing at Mount Pleasant, in the county of Westmoreland and State of Pennsylvania, have invented certain new and useful Improvements in Methods of Removing Loose Materials, Dust, and Gases from Mines, of which the following is a specification.

My invention relates to mine ventilation, and particularly to a method of removing loose materials, dust and gases, and other impurities from the separate compartments, passages, or rooms of a mine.

The objects of my invention are to avoid the danger and reduce the number of accidents to miners employed in operating the mines and to prevent the accumulation of explosive gases and compounds. The danger of such explosions has been very greatly increased in coal-mines by the introduction of machinery for the cutting of the coal, and the use of gunpowder and other blasting compounds used in throwing down the coal from the face of the rooms or passages. The cutting machinery causes large quantities of fine coal-dust, and when a sufficient amount has accumulated a dangerously explosive mixture results. It has been found that recent explosions are due largely to this cause.

My present invention provides a method of removing the dust and gases, withdrawing the loose materials from the roof and walls, drawing out the occluded gases from the crevices, collecting the dust in settling chambers and withdrawing the gases from the mine.

For the purpose of illustrating one arrangement by which my invention may be carried out, and for the purpose of more clearly describing my method of removing dust and gases, reference is made to the accompanying drawings, in which—

Figure 1 illustrates a horizontal section through the headings and rooms of a mine, showing one arrangement for carrying out my invention; and Figs. 2 and 3 are detail views of the entrance to a heading, showing one form of a door by which the heading may be sealed.

The exhaust pump 1, together with its operating engine or other motor 2, may be conveniently located in a room 3 excavated for this purpose at the bottom of shaft 4, and from which entrance is obtained into the mine through the main heading 5. The branch headings 6 and 7 lead to the various rooms 8 cut into the face of the coal vein, the coal being removed from the ends of these rooms in which the cutting machinery is located. Fans or blowers are operated at the entrances of the several headings for the purpose of supplying fresh air and ventilating the rooms, but it has been found that it is impossible to remove the dust and gases which accumulate in the inner ends of the rooms and this accumulation results in the explosive mixtures which endanger the lives of the miners as well as the property of the mine.

A system of piping is led from the main shaft having the main pipes or conduits 10 suspended from the roof of the headings with branch pipes 12 leading therefrom into the several rooms and into proximity to the face of the coal where the cutting machinery is in operation. A branch main 13 leads from the main 10 into the settling chamber 15, from which the exhaust pipe 16 leads to the pump 1.

At the entrance to the headers and at intermediate points if desirable, there are placed sliding doors 20 by means of which the passages may be closed and sealed airtight. Similar doors 21 also control the passages 22 and 23 leading into the dust settling and collecting chamber 15.

The thorough cleaning of the mine and the removal of practically all of the dust, gases, and impurities is preferably accomplished at night, as this must be done when the mine is not in operation. For this purpose the door 20 at the entrance to the main heading is closed, thus sealing the entrance airtight, the other doors remaining open in their lowered position. The valve 25 is closed, shutting off the main 10 from the outside atmosphere. The exhaust pump is set in operation and withdraws the air and gases from the passages of the mine until the atmospheric pressure has been very much reduced, say to five pounds per square inch, as shown by the pressure indicator 27. As the air pressure is reduced, becoming lighter in weight, the gases will be drawn out of the crevices, falls, and old workings and places where there is no circulation of air and will mix with the light air now in the mine and be drawn out therewith through the exhaust channels by the operation of the pump. The reduction in the air-pressure in the mine also causes the loose slate and other materials in the roof of the headings and passages to fall, thus removing a serious menace to the lives of the miners. After the pressure in the mine has been sufficiently reduced, the dust, gases, and other light impurities may be removed by closing the valve 26 in the pipe 13 and opening the valve 25, whereupon the air from the outside will rush through the pipes, issuing with great force from the pipes 12 at the inner ends of the several rooms, causing strong drafts which will force the dust and any remaining gases from the rooms into the headings, from which the only exhaust is through the passage 22 into the settling chamber 15. The dust will be collected and settled in traversing the tortuous path in the chamber 15 and may be assisted by sprays of water therein; while the gases will be drawn out through the pipe 16 by the operation of the pump and will pass out through the exhaust 29. The mine will thus be thoroughly cleansed of practically all dust and impurities and the collected dust and dirt may be manually removed by entering the chamber 15 through the several entrance passages 22 and 23. It will be seen that by providing a settling and dust collecting chamber between the passage 22 and the exhaust pipe 16, the dust and other solid particles are removed before the gases enter the exhaust pump, thus preventing the destruction thereof which would result if the dust and solid particles were allowed to enter the same.

In order that there may be no large accumulation of dust and impurities while the miners are at work, during which time the doors leading into the headings are all open and the fan blowers are operating in the headings, I arrange to withdraw the dust and gases continuously from the inner ends of the rooms by means of the same system of piping. For this purpose I close the valve 30 and open the valve 26, and also close the door 21 at the entrance to the exhaust passage 22. The exhaust pump will now create a suction continuously through the pipes 12, main 10, and branch main 13, and through the settling chamber and exhaust pipe 16. The dust will be collected in the chamber 15 while the gases will be forced out through the exhaust pipe 29. It will thus be seen that I provide against the accumulation of any dangerous amount of dust and gases during the working hours, and thoroughly cleanse the mine of all dust and gases during the time that the mine is closed down.

In Figs. 2 and 3, I have shown detail views of a sliding door by which the headings and passages may be sealed. A frame having side members 40 and top member 41 is fitted within the passage and forms the guide for the sliding door 42, an air-tight joint being insured by a resilient sealing material 43 which extends around the sides, top and bottom of the frame. The door may also be further secured by means of cam levers, as will be clearly understood. In order that the operation of the door shall not interfere with the track which extends through the headings of the mine, a pit or well 44 extends below the frame, the door being suitably balanced by weights and pulleys or otherwise so that it may be readily lowered into the pit or raised into its closed position. Sections of rails 45 are carried by the top of the door, which pass up within the top guide of the door frame when the door is in its raised position.

From the foregoing description, it will now be clear that I have provided an efficient method of removing the dust, gases and other impurities which accumulate in the inner ends of the rooms and passages of mines, and in crevices, falls, and old workings in which the gases may be occluded. It will be apparent that I may seal certain portions of the headings and cleanse a portion of the mine, or I may seal the entrance and cleanse the entire mine at one time. When the gases are to be removed and the air-pressure reduced in the entire mine, the doors 20 at the entrances to the headings and the doors 21 of the settling chamber may be left open, the exhaust pump drawing the air from the headings and passages through the pipe 16. By arranging the system of piping and the pumping apparatus and dust collecting chamber as above described, so that strong drafts or blasts of air may be injected into the interior rooms when the mine is closed down and then causing the suction through the system of piping during the working hours, I have provided an exceedingly economical system. By my method of reducing the atmospheric pressure I am enabled to draw out the occluded gases and loose materials, which would not be effected merely by the use of fans or drafts.

The means for carrying out the method disclosed herein is claimed in my application Serial No. 421,328, filed March 16, 1908, now Patent No. 899,508.

Having now described my invention and the manner in which the same may be carried out, I claim as new and desire to secure by Letters Patent:—

1. The method of removing dust and gases from mines, which consists in reducing the atmospheric pressure within the mine, introducing blasts of air at a plurality of points within the mine, thereby causing strong drafts to traverse and drive out the dust and gases from the passages of the mine, and for removing said dust and gases.

2. The method of removing dust and gases from mines, which consists in reducing the atmospheric pressure within the mine, introducing air at a higher pressure into the mine in the vicinity of the inner rooms and passages of the mine, thereby creating strong drafts from the rooms into the headings, and causing the dust and gases to pass into exhaust channels.

3. The method of removing dust and gases from mines, which consists in sealing the mine, withdrawing the air and gases and reducing the atmospheric pressure therein, introducing air at a higher pressure than said reduced pressure at a plurality of points within the mine, thereby causing strong drafts to traverse and drive out the dust and gases from the passages of the mine into exhaust channels.

4. The method of removing dust and gases from mines, which consists in reducing the atmospheric pressure within the mine, introducing air at a higher pressure into the mine in the vicinity of the inner ends of the rooms or passages of the mine, thereby causing strong drafts from the rooms into the headings, and causing the dust and gases to pass into dust settling and collecting chambers.

5. The method of withdrawing loose materials from the roofs and walls of mines, which consists in sealing the mine and exhausting a portion of the air and gases, thus reducing the atmospheric pressure therein, thereby drawing the occluded gases and loose materials from the roof, walls, and crevices in the mine, the dust and finer particles being carried out with the exhaust.

In testimony whereof I affix my signature in presence of two witnesses.

FRANK T. BYERS.

Witnesses:
DAVID C. BYERS,
EDGAR M. BYERS.